United States Patent [19]
Yoshida et al.

[11] Patent Number: 4,466,037
[45] Date of Patent: Aug. 14, 1984

[54] RECORDING REPRODUCING APPARATUS

[75] Inventors: Shigeru Yoshida; Akira Osabe; Takayuki Hoashi, all of Chichibu, Japan

[73] Assignees: Canon Kabushiki Kaisha, Tokyo; Canon Denshi Kabushihi Kaisha, Saitama, both of Japan

[21] Appl. No.: 306,360

[22] Filed: Sep. 28, 1981

[30] Foreign Application Priority Data

Oct. 9, 1980 [JP] Japan ................................. 55-141198

[51] Int. Cl.³ .............................................. G11B 23/02
[52] U.S. Cl. .................................................. 360/133
[58] Field of Search ................... 360/135, 102, 97–99, 360/128, 137, 133, 74.6; 206/444, 309

[56] References Cited

U.S. PATENT DOCUMENTS

| 3,668,658 | 6/1972 | Flores et al. ............... 360/133 X |
| 4,223,359 | 9/1980 | Galvagni ..................... 360/86 X |
| 4,263,634 | 4/1981 | Chenoweth et al. ......... 360/133 |
| 4,272,793 | 6/1981 | Van Landingham ......... 360/133 X |
| 4,272,795 | 6/1981 | Davis, Jr. et al. ............. 360/133 X |
| 4,368,495 | 1/1983 | Hamanaka et al. ........... 360/97 |

Primary Examiner—Aristotelis M. Psitos
Assistant Examiner—Kin Wong
Attorney, Agent, or Firm—Fitzpatrick, Cella, Harper & Scinto

[57] ABSTRACT

A recording-reproducing apparatus, comprising first and second holding members and support member for supporting said first and second holding members, and for permitting said first holding member to move towards and away from said second holding member. The first holding member holds on one side thereof, a container member for containing a recording medium therein, and on an opposite side thereof, an adjusting member for adjusting the position of the recording medium. The second holding member holds a driving member for driving the recording medium. The apparatus also includes resilient means for pressing said container member against the one side of said first holding means in a position wherein said first holding means is spaced apart from said second holding means, and for permitting said container member to move towards the opposite side of said first holding means to enable said adjusting member to bear against the recording medium when said first holding means is proximate to said second holding means and recording-reproducing means for effecting recording and reproducing of information on the recording medium.

10 Claims, 15 Drawing Figures

RECORDING REPRODUCING APPARATUS

BACKGROUND OF THE INVENTION

1. Field of the Invention

This invention relates to a recording-reproducing apparatus which effects recording or reproduction of information on a recording medium contained in a container body mounted on the apparatus.

2. Description of the Prior Art

Recording-reproducing apparatus which effect recording or reproduction on a sheet-like recording medium contained in a container are widely known. In such apparatus, a recording medium has been stationarily disposed on a driving mechanism and a locating-out mechanism has been moved to move the stationary recording medium by some amount and move it to its regular position while, at the same time, the recording medium has been fixed to the driving mechanism.

When the apparatus has been designed such that only the locating-out mechanism is moved with the recording medium being so fixed, it has been necessary to move further the recording medium (in order to compensate for the thickness of the container and to drive the recording medium at an accurate position) until a magnetic medium in the recording medium can be driven after the recording medium has been loaded, or to make the thickness of the container sufficiently thin.

Also, widely known are recording-reproducing apparatus which effect recording or reproduction by selecting the tracks on a recording medium such as a magnetic sheet or the like. Selection of such tracks has been accomplished, for example, by selecting a recording-reproducing head movable in a direction radial to that of the recording medium by means of a pulse motor.

However, when an attempt has been made to determine the amount of movement of the head by only the amount of revolution of the motor, it has not always been possible to move the head to an accurate position because of play in a mechanism for transmitting the amount of revolution of the motor, the fluctuation in load, etc.

Also known is a recording body containing a magnetic sheet in a jacket of paper, but the direction in which such a recording body is to be inserted into a recording-reproducing apparatus is only indicated by an arrow printed on the jacket and therefore, confirmation of the direction of insertion is necessary prior to the mounting of the recording body.

Also, even if the recording body has been inserted in a wrong direction, it is very difficult to find out about the wrong insertion, and therefore the operator may sometimes drive the loading mechanism without noticing the wrong insertion.

Also, widely known is a recording-reproducing apparatus wherein a cassette containing a recording medium therein is contained in a containing portion which is moved to permit the cassette to be loaded at a recording medium driving position, but if the resiliency of a resilient member for fixing the cassette at a predetermined position in the containing portion is too strong, a large force will be required to insert the cassette during the loading or else the cassette will be damaged.

If the resiliency of the resilient member is decreased in order to eliminate the above disadvantage, the pressing force of the cassette during its engagement will become too small.

Also known is a recording body wherein a recording medium is contained in a jacket of paper and a liner is provided between the recording medium and the jacket. In such a recording body, the liner and the recording medium have been provided so as to make surface contact with each other.

Such surface contact had led to great deal of friction between the recording medium and the liner, and has required a large driving torque during the start of driving of the recording medium.

Also known is an apparatus wherein a light-transmitting portion provided on a recording medium is detected to take out a reference signal, but in such an apparatus, a light-emitting element has been provided on one side of the recording medium and a light-receiving element on the other side of the recording medium, and therefore, the locating-out of the light-emitting element and the light-receiving element had to be effected on discrete members. This has led to a poor working property.

Also, such a construction is adopted to detect one light-transmitting portion and therefore, if the surface of the recording medium peels off and the base thereof becomes exposed, the possibility of malfunctioning will be high.

SUMMARY OF THE INVENTION

It is a first object of the present invention to effect recording or reproduction of information with a recording medium properly mounted.

It is a second object of the present invention to accurately locate out a head which effects recording or reproduction of information on the recording medium.

It is a third object of the present invention to prevent wrong insertion of a cassette containing the recording medium therein.

It is a fourth object of the present invention to enable the cassette to be inserted by a very small force during the loading thereof, and to enable the cassette to be held with a sufficiently large force during the engagement thereof.

It is fifth object of the present invention to enable a magnetic sheet to be driven by a small force, and to provide a liner having a high cleaning effect.

It is a sixth object of the present invention to enable the reference position of the recording medium to be detected very easily.

The invention will become fully apparent from the following detailed description of an embodiment thereof taken in conjunction with the accompanying drawings.

DESCRIPTION OF THE PREFERRED EMBODIMENT

Referring to FIG. 1, it shows a cassette 1 applied to a recording-reproducing apparatus (the term "recording-reproducing apparatus" used herein generally refers to an apparatus having a recording or a reproducing function or a recording and a reproducing function). This cassette or container member 1 comprises an upper container 2 and a lower container 3 of the same configuration both formed of plastic. Both containers abut against each other and contain therein liners 11, 12 and a magnetic sheet 5.

Figure 1A:
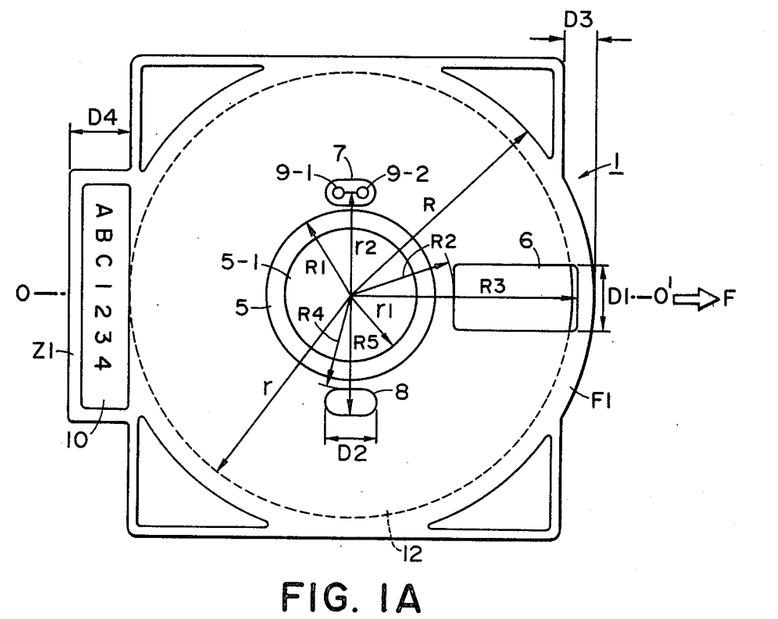
FIG. 1A is a top plan view of a cassette.
Figure 1B:
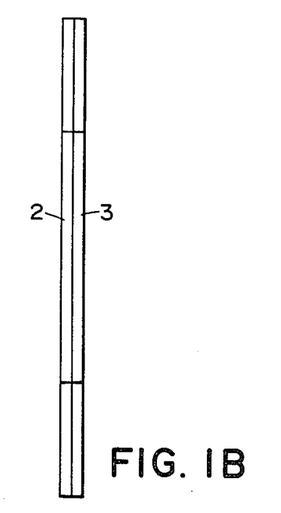
FIG. 1B is a side view of the cassette.
Figure 1C:
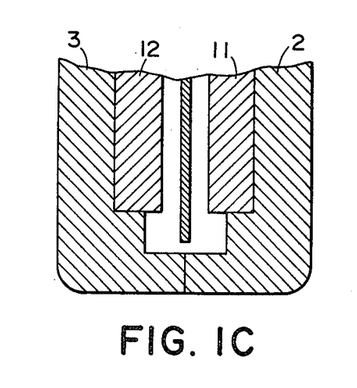
FIG. 1C is a cross-sectional view of the cassette.

More particularly, each of the containers 2 and 3 is provided with a projection having a radius R and the central portion of each of the containers 2 and 3 is cut away into a circular shape having a radius R1. Thus, a disc-shaped space sufficient to contain the magnetic sheet 5 having a radius r ($R > r$) is formed by the containers 2 and 3, and the magnetic sheet is contained in this space.

Figure 1D:
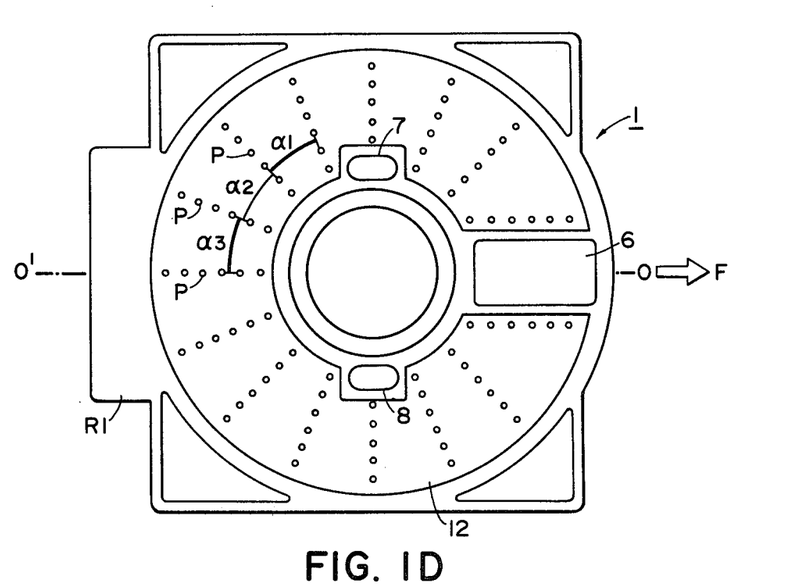
FIG. 1D is a top plan view of the cassette with the upper container thereof removed.

The central portion of the magnetic sheet 5 is cut away into a circular shape of radius r1 ($R1 > r1$) to form a cut-away 5-1, and therefore, the magnetic sheet 5 is exposed in the central portion of the containers.

In a portion of these containers, a rectangular cut-away 6 is provided over a width D1 in an area from radius R2 to R3 to read out the information on the magnetic sheet 5 by means of a magnetic head.

Also, on a straight line perpendicular to the diameter passing through the cut-away 6, cut-aways 7 and 8 of the same configuration are provided over a width D2 in an area from radius R4 to R5 to detect light-transmitting portions 9-1 and 9-2 provided on the radius of magnetic sheet 5.

In these containers, a pair of opposed sides of substantially a quadrilateral, namely, the front portion F1 and the rear portion Z1 in the mounting direction F with respect to the reproducing apparatus, are made into protrusions of different configurations, that is, an arcuate protrusion of distance D3 is formed in the front portion F1 and a rectangular protrusion of distance D4 is formed in the rear portion Z1. A label 10 is attached to the rear portion Z1 to provide the function of displaying the record contents recorded on the magnetic sheet 5 and the function of preventing the reproducing apparatus from being locked even when the cassette is inserted in the opposite direction as will hereinafter be described.

Liners 11 and 12 comprising synthetic resin fibers formed into the form of a fabric are secured to the surfaces of the containers 2 and 3 which are opposed to the magnetic sheet.

Liners 11 and 12, as shown in FIG. 1D, are of a shape corresponding to the magnetic sheet 5 and are cut-away at places corresponding to the cut-aways 6, 7 and 8.

In the present embodiment, spot fusion is used to secure liners 11 and 12 to the containers 2 and 3 and the locations at which the liners are secured are selected diametrically at each predetermined angle $\alpha$. That is, the liners are secured radially at predetermined intervals (the intervals need not always be $\alpha 1 = \alpha 2 = \alpha 3 =, \ldots = \alpha n$, but may be $\alpha 1 \neq \alpha 2$, $\alpha 2 \neq \alpha 3$, $\ldots \alpha n - 1 \neq \alpha n$). (In FIGS. 1E and 1D, reference character P designates the locations at which the liners are secured.)

Figure 1E:
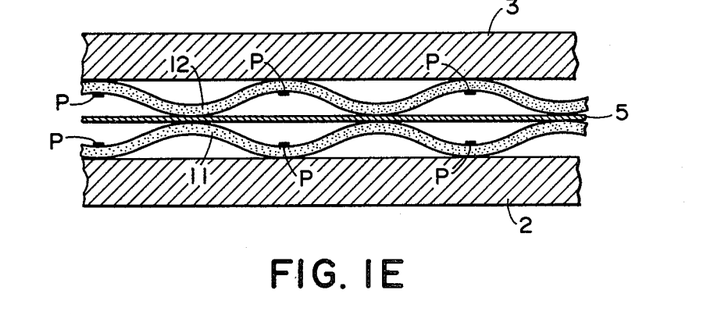
FIG. 1E is a cross-sectional view of the cassette.

If the liners are secured radially, they present a wave form as shown in FIG. 1E and contact the magnetic sheet 5 at the crests of the wave.

With such a construction, the normal irregularity, of touching between the magnetic sheet 5 and the liners can be made uniform. This in turn leads to the possibility of making constant the starting torque at the start of driving of the magnetic sheet 5 and to an enhance the cleaning effect by the liners.

Also, by selecting the locations at which the liners are secured so that these locations are substantially symmetrical with respect to the straight line 0-0' in FIG. 1D, the crests of the wave of the liners can become opposed to each other, as shown in FIG. 1E, and the magnetic sheet 5 can be sandwiched at the opposed locations.

Such a construction can prevent deformation of the magnetic sheet 5 and can rotate it with a small torque.

While, in the above-described embodiment, the locations at which the liners are secured are selected radially, those locations need not always be selected radially. However, it is essential that they be located so that the magnetic sheet 5 crosses the waving liner portions extending out in one direction (in FIG. 1E, the direction perpendicular to the plane of the drawing sheet).

The term "radially" used herein need not be strictly radially, but the arcuate bulges of the liners may extend in the circumferential direction.

The following is a description of an apparatus for reading out or recording information from the magnetic sheet contained in the cassette of the described construction.

Figure 2A:
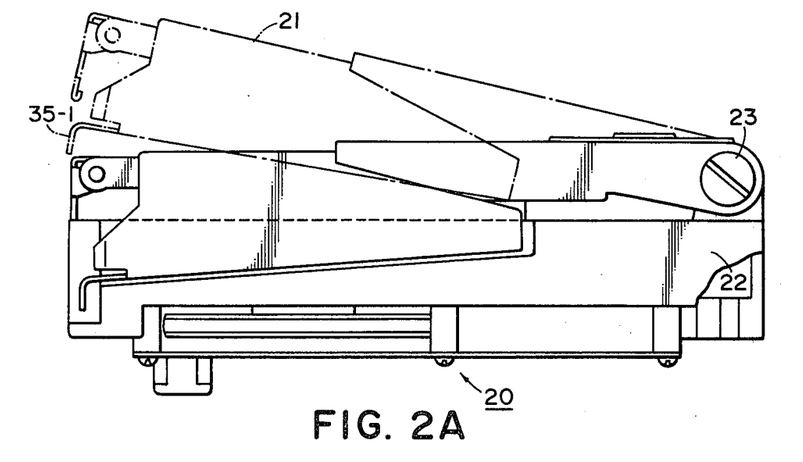
FIG. 2A is a side view of a recording-reproducing apparatus.

Referring to FIG. 2, the recording-reproducing apparatus 20 comprises an upper mechanism 21 and a lower mechanism 22, the two mechanisms being fixed together by a shaft 23. As shown in FIG. 2A, the upper mechanism 21 is mounted to the lower mechanism for rotation about the shaft 23 and may assume an open position as indicated by dot-and-dash lines and a closed position as indicated by solid lines.

In the open position as shown in FIG. 2A, the cassette is loaded into the upper mechanism and, in the closed position as shown in FIG. 2A, the magnetic sheet in the cassette 1 is located out and can be driven. Such an upper mechanism will be described in greater detail.

Figure 2B:
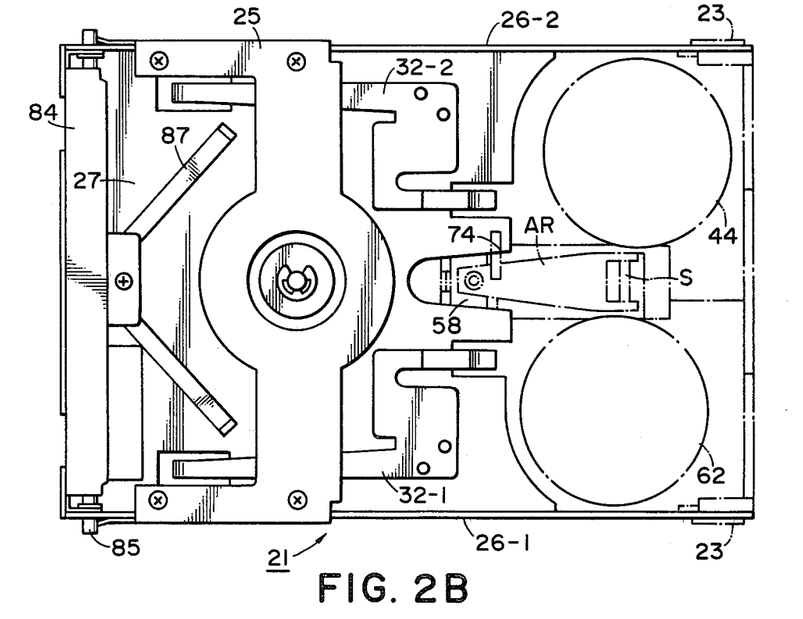
FIG. 2B is a top plan view of the apparatus.

In FIG. 2B, solid lines indicate the upper mechanism 21 which is provided with a holding mechanism for holding the cassette 1, a locating-out mechanism for locating out the magnetic sheet, and an opening-closing mechanism for opening or closing the upper mechanism with respect to the lower mechanism.

Figure 3A:
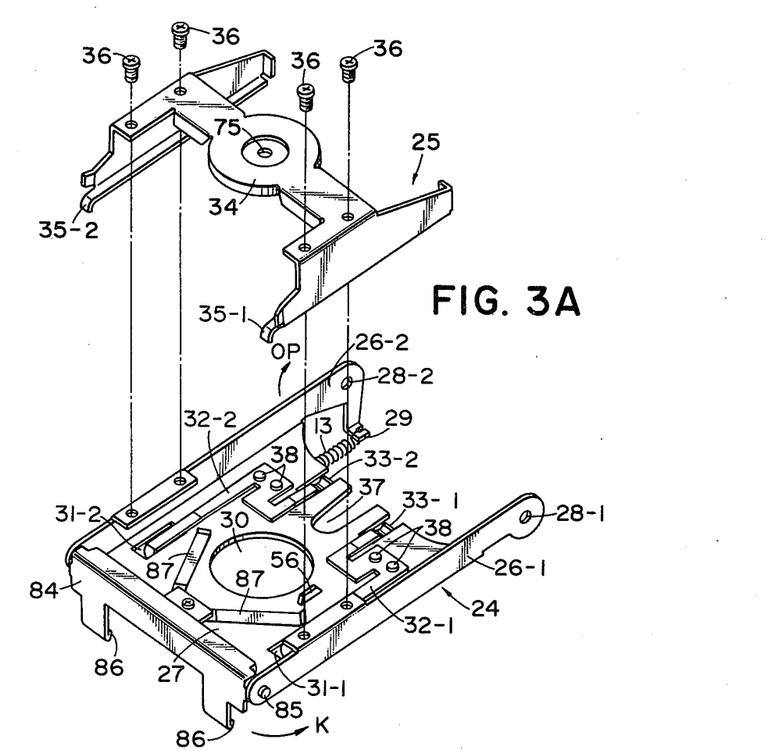
FIG. 3A is an exploded perspective view of the upper mechanism.

As shown in FIG. 3A, the upper mechanism 21 comprises a base portion 24 and a fixed portion 25, the base portion 24 comprising a pair of arms 26-1 and 26-2 and a bottom plate 27 provided between these arms, the arms 26-1 and 26-2 being provided in the end portions thereof with holes 28-1 and 28-2 for fixing the arms to the lower mechanism 22 by means of the shaft 23. The end 29 of the arm 26-2 extends downward and serves as a stopper for bearing against the lower mechanism 22 in the open position so that the upper mechanism 21 is not opened through more than a predetermined angle with respect to the lower mechanism 22, and the arms 26-1 and 26-2 are normally biased in the direction of arrow OP by a spring 13 provided in a portion of the arm 26-2.

A hole 30 provided in a portion of the bottom plate 27 is one in which a locating-out mechanism to be described hereinafter is positioned, and holes 31-1 and 31-2 are for causing the ends of springs 32-1 and 32-2 to press the cassette 1 to be projected further downward from the bottom plate 27. The other ends of the springs 32-1 and 32-2 face the cut-outs 33-1 and 33-2 of the bottom plate 27, and the cassette is likewise pressed by these other ends through the cut-outs 33-1 and 33-2.

A cut-out 37 is one in which a head pressing member to be described, is positioned. The fixed portion 25 has guide rails 35-1 and 35-2 used when a base portion 34 for fixing the locating-out mechanism which will hereinafter be described and the cassette 1 are inserted. The base portion 24 and fixed portion 25 are connected integrally to each other by screws 36.

Figure 3B:
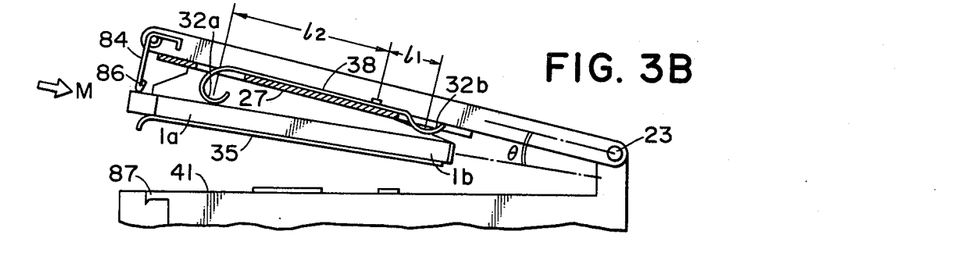
FIGS. 3B and 3C are side views showing the loaded condition of the cassette.

Loading and fixing of the cassette 1 will be described by reference to FIGS. 3B and 3C. As shown in FIG. 3B, in the open position, the cassette 1 is placed onto the rails 35 and forced in the direction of arrow M.

The springs 32 are designed such that at this time, the inserted side end 32a thereof forces the cassette 1 towards the rails 35 with a light force and the end 32b is spaced apart from the cassette 1.

The springs 32 are fixed to the bottom plate 27 by screws 38 and the locations at which the springs 32 are so fixed are selected such that the distances thereof from the spring ends 32a and 32b are l2 and l1 (l2>l1). By so constructing, the pressing force by the end 32a is made small and the pressing force by the end 32b is made large and therefore, the friction of the cassette with the springs 32 when the cassette is inserted can be made small.

Also, the angle formed by bottom plate 27 with the rails 35 is θ.

Figure 3C:
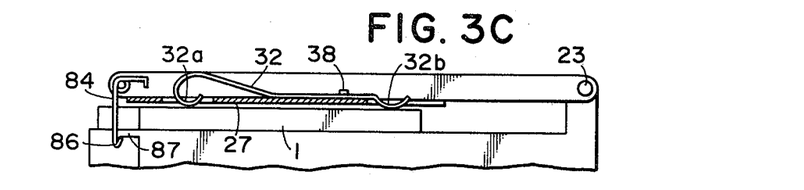

With such a construction, when the apparatus has been brought to its closed position as shown in FIG. 3C, the pressing force of the spring 32a can be increased and the forces with which the cassette 1 is pressed by the springs 32a and 32b can be made substantially equal to each other.

Figures 4A, 4B:
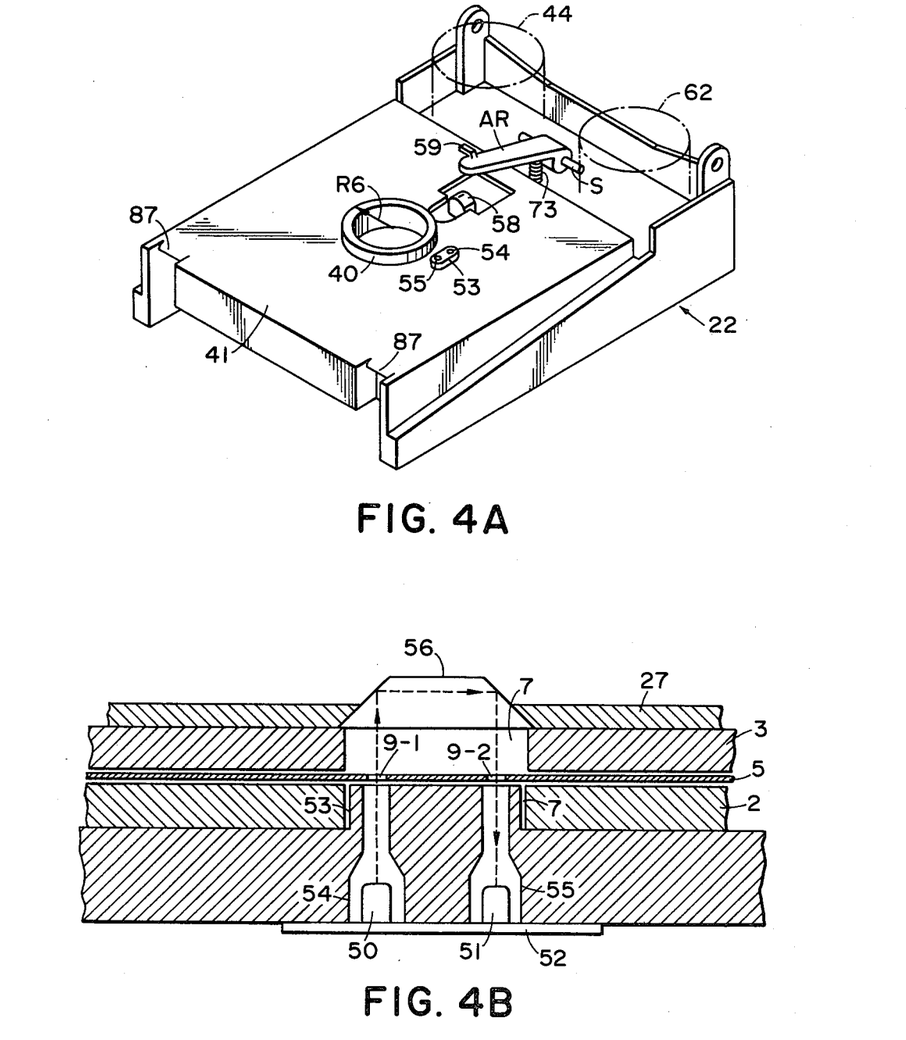
FIG. 4A is a perspective view showing the lower mechanism.
FIG. 4B is a cross-sectional view showing a reference signal forming portion.

FIG. 4A is a perspective view of the lower mechanism 22, which includes a driving mechanism for driving the magnetic sheet, a moving mechanism for moving the magnetic head, and a sheet pressing mechanism.

The lower mechanism 22 is provided with a driving ring 40 having a circular ring-like projection. The outside diameter R6 of this ring is smaller than the radius R1 of the through-hole provided in the cassette 1 and greater than the radius r1 of the magnetic sheet, so that it can be opposed to that portion of the magnetic sheet 5 which is exposed from the cassette 1.

Figure 2C:
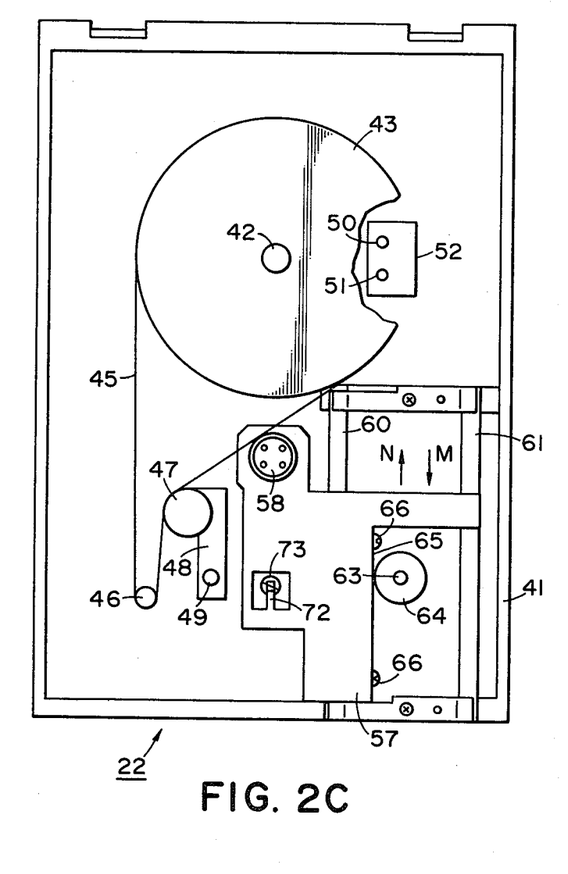
FIG. 2C is a bottom plan view of the apparatus.

The rotary shaft 42 of ring 40 extends out to the reverse surface of a base 41, as shown in FIG. 2C, and in the reverse surface, a fly-wheel 43 is fixed to the rotary shaft 42. A belt 45 wound on the rotary shaft 46 of a motor 44 (FIG. 4A) is wound on the fly-wheel 43. Accordingly, by the motor 44 being driven, the ring 40 can be driven.

Designated by 47 is a tension roller fixed to an arm 48 which in turn is rotatably fixed by a shaft 49.

As shown in FIG. 2C, a printed substrate 52 to which a light-emitting element 50 for converting an electrical signal into a light signal and a light-receiving element 51 for converting a light signal into an electrical signal are fixed is secured between the fly-wheel 43 and the base 41. On this base 41, a projection 53 as shown in FIGS. 4A and 4B is provided at a position opposed to the light-emitting element 50 and the light-receiving element 51, and through-holes 54 and 55 (the spacing between these through-holes 54 and 55 corresponds to that between the light-transmitting portions 9-1 and 9-2 of the magnetic sheet 5) are provided in the projection 53 so as to be opposed to the respective elements.

Projection 53, as shown in FIG. 4B, is provided at a location corresponding to the cut-away 7 (or 8) provided in the cassette 1 and therefore, when the cassette is mounted to the reproducing apparatus, the projection 53 comes into the cut-away 7 of the cassette and becomes opposed to the magnetic sheet 5.

Also, a prism 56 is provided on the bottom plate 27 at a location opposed to the projection 53.

Accordingly, when the magnetic sheet 5 is rotated with the cassette 1 being mounted to the reproducing apparatus, as shown in FIG. 4B, a light path leading from the light-emitting element 50 through the prism 56 to the light-receiving element 51 as indicated by dotted line is formed at the moment when the light-transmitting portions 9-1 and 9-2 have arrived at the locations opposed to the through-holes 54, and 55 and thus, a light-receiving output can be obtained from the light-receiving element 51.

Such a light path is not formed when the light-transmitting portions are not in their conditions as shown, and therefore the light-receiving output cannot be obtained during the other period.

Accordingly, such a light-receiving output can be used as a reference signal for informing that the magnetic sheet is in a particular position.

The following description will be made by referring to FIG. 2C. Designated by 57 is a base provided with a magnetic head 58 shown in FIG. 4A and a pressing mechanism 59 for pressing the magnetic sheet 5 against the magnetic head 58. This base 57 is slidably fixed on two guide rails 60 and 61.

Designated by 64 is a pulley fixed to the rotary shaft 63 of a pulse motor 62 shown in FIG. 4A. A steel belt 65 is wound on the pulley 64 and the opposite ends of the steel belt 65 are fixed to the movable base 57 by screws 66.

Accordingly, by applying a drive signal to the pulse motor 62 and by rotating the pulley 64, the movable base 57 is moved in the direction of arrow M or N.

Figure 4C:
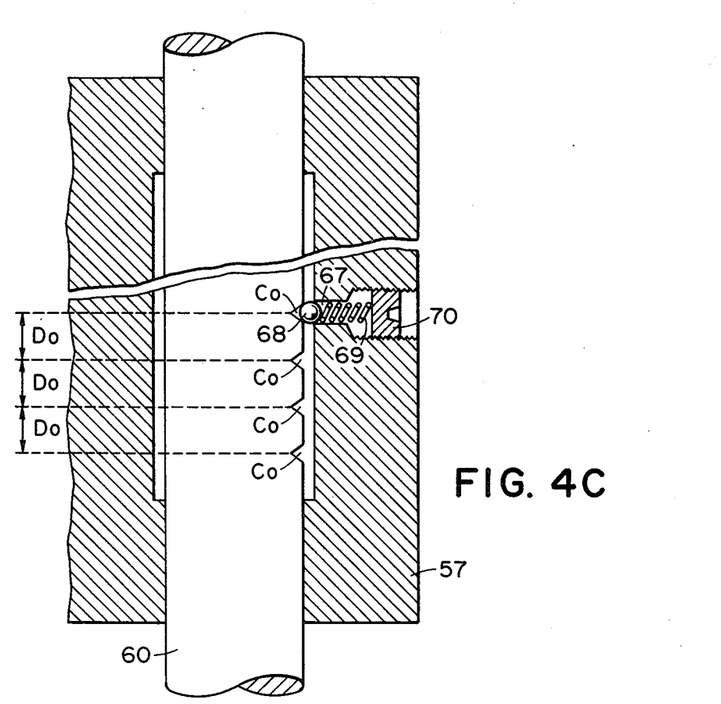
FIG. 4C is a cross-sectional view showing a head feeding mechanism.

As shown in FIG. 4C, in a portion of the guide rail 60, V-shaped grooves Co are formed with a distance Do therebetween (this distance is equal to the spacing between the recording tracks on the magnetic sheet 5) and a metal ball 68 received in a hole 67 provided in the movable base 57 is engageable with one of the V-shaped grooves to modify the positions of the movable base 57 and the magnetic head 58. A spring 69 for urging the ball 68 toward the guide rail is provided in the hole 67 and is fixed by a screw 70 and therefore, when the pulse motor 62 is driven to bring the movable base 57 to a desired position, even if such a position is somewhat deviated, the ball 68 urged by the spring 69 can come into the adjustment or V-shaped groove Co to effect the modification and to fix the movable base at an accurate position. Designated by 58 is the magnetic head, and the back side thereof is shown.

The pressing mechanism 59 is provided on the movable base 57 as previously described and as shown in FIG. 4A, and this mechanism is constructed by rotatably fixing an arm AR to a shaft S provided on the movable base 57, as shown in FIGS. 2B and 4A, so that the head 58 and the arm AR sandwich the magnetic sheet therebetween by pulling the arm AR by means of a projection 72 provided on the movable base 57 and a fixed coil spring 73.

A projection 74 is provided on a portion of the arm AR as shown in FIG. 2B so that the projection 74 engages the bottom plate 27 (in the closed position, there is some clearance between the two) and therefore, in the open position, the projection 74 is raised by the bottom plate 27, whereby the entire arm AR is pivoted upward about the shaft S to assume a position as shown in FIG. 4A, thereby permitting insertion of the cassette 1 into between the arm AR and the magnetic head 58.

Figure 4D:
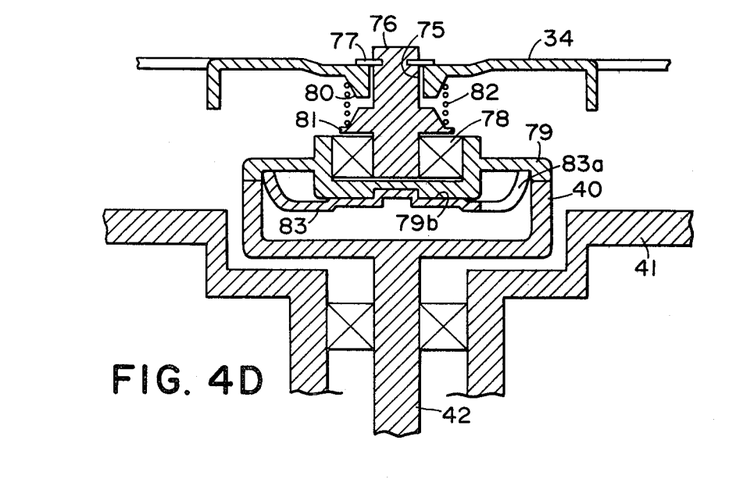
FIG. 4D is a cross-sectional view showing a locating-out mechanism.

Referring to FIG. 4D there is described a mechanism for locating out the magnetic sheet 5 and fixing it at a predetermined position.

The base portion 34 of the fixed portion 25 is provided with a hole 75 into which a shaft 76 is inserted, and a C-shaped pin 77 is fixedly fitted in the groove of the shaft 76 so as to prevent the shaft 76 from slipping down. The inside diameter of the hole 75 is made somewhat larger than the outside diameter of the shaft 76 to render the shaft 76 rockable. A disc-like push ring 79 is fixed to the shaft 76 through a bearing 78. The inside and outside diameters of the push ring 79 are substantially in accordance with the inside and outside diameters of the ring 40 and the magnetic sheet is rotatably driven while being sandwiched therebetween. Of course, the push ring 79 is rotatable relative to the shaft 76.

A conically inclined portion 80 is provided around the hole 75 of the base portion 34 and a conically inclined portion 81 is also provided on the shaft 76 at a location opposed to the inclined portion 80. A coil spring 82 is provided having resiliency in a direction so that it expands between the two inclined portions.

A guide plate 83 is fixed to the bottom 79b of the push ring 79. This guide plate 83 is formed of a plastic material having resiliency and having a dish-like configuration. Seven notches 83a are provided diametrically of the guide plate 83 at equal intervals to form seven tongues.

In the normal condition, the tip ends of these tongues bear against the inner side of the push ring 79 so that they do not expand beyond the shown condition.

Description will now be made of a locating-out mechanism comprising such a construction.

In a condition in which the upper mechanism 21 is about to be depressed into its closed position after the cassette 1 has been inserted into the upper mechanism as already described, if the magnetic sheet 5 is eccentrically mounted in the cassette 1, the tip end of the guide plate 83 is first inserted into the cut-away 5-1 of the magnetic sheet 5.

If, in such a condition, the guide plate 83 is further lowered, the magnetic sheet 5 moves to its regular position such that the cut-away 5-1 comes into the guide plate 83. If the upper mechanism is further forced in this manner, the magnetic sheet 5 exposed from the cassette 1 can be sandwiched between the ring 40 and the push ring 79.

It is preferable that as described above, during the locating-out of the magnetic sheet, not only the magnetic sheet moves but also the guide plate 83 initially moves to a certain degree. However, in the embodiment shown in FIG. 4D, the base portion 34 and the inclined portion 81 are only expanded by the coil spring 82 and therefore, if a force sufficient to resist the force of this spring is applied, they can be rocked or axially moved.

Since the coil spring 82 is provided between the two inclined portions 80 and 81, the shaft 76 can always be positioned at the center of the hole 75 in spite of there being some clearance between the hole 75 and the shaft 76.

Referring to FIGS. 2B and 3A to describe further a locking mechanism for holding the apparatus in its closed position.

Designated by 84 is a restraining plate rotatably fixed to a shaft 85 which in turn is fixed to the arm 26 of the base 24. This restraining plate 84 is provided with two hook-shaped restraining portions 86. A spring 87 is provided between the restraining plate 84 and the bottom plate 27 to bias the restraining plate 84 for rotation in the counter-clockwise direction (directon K).

Accordingly, when the upper mechanism is depressed downward in the condition as shown in FIG. 3B, the restraining portions 86 restrain restraining portions 87 provided on the base 41.

To bring the apparatus to its open position, the upper portion of the restraining plate 84 may be pushed to rotate the restraining plate 84 clockwise.

By constructing the apparatus so that the rear portion Z1 of the cassette 1 is exposed from between the restraining portions 86 when the cassette 1 is mounted into the upper mechanism 21 as shown in FIGS. 3B and 3C, the restraining portions 86 avoid bearing against the cassette and restrain the restraining portions 87. However, the apparatus may be designed such that when the cassette has been inserted with the front portion F1 thereof being mistaken for the rear portion Z1 thereof, the protrusion of the rear portion Z1 which has the distance D4>D3 shown in FIG. 1A bears against the coil spring 73 of FIG. 4A to change the mounted position of the cassette and the front portion F1 of the cassette bears against between the restraining portions 86 and the base 41 to prevent the apparatus from being closed.

By so designing the apparatus, a wrong insertion of the cassette 1 can be prevented.

What we claim is:

1. A recording-reproducing apparatus, comprising:
   first driving means for rotatively driving a recording medium;
   a magnetic head for recording information on the recording medium and for reproducing information from the recording medium;
   means for mounting the magnetic head;
   guide means including a rodlike member having grooves at predetermined intervals, for guiding said mounting means in a predetermined direction;
   second driving means for driving said mounting means along said guide means; and
   engaging means provided with said mounting means for engaging any one of the grooves of said guide means so that said mounting means may be stopped at predetermined intervals.

2. A recording-reproducing apparatus, comprising:
   recording-reproducing means for recording and for reproducing of information on a recording medium;
   a container member for containing the recording medium therein, and being provided with an opening through which said recording-reproducing means bears against the recording medium, said container member having a substantially quadrilateral shape and having protrusions of different shapes formed on a pair of opposed sides of the quadrilateral shape, said protrusions providing an indication of the proper mounted position of said container member;

first holding means for holding said container member in proper position as indicated by said protrusions;

second holding means; a driving member held by said second holding means for driving the recording medium; and restraining means provided on said first holding means, and for restraining said first holding means at a position adjacent said second holding means when said container is held in a proper position in said first holding means as indicated by said protrusions.

3. A recording-reproducing apparatus according to claim 2, wherein said restraining means bears against said container member and prevents said first holding means and said second holding means from becoming adjacent each other when said container member is not properly held in said first holding means as indicated by said protrusions.

4. A recording-reproducing apparatus, comprising:

driving means for rotatably driving a recording medium contained in a container member;

first holding means having one side and an opposite side, for holding on said one side the container member for containing a recording medium therein, and on said opposite side thereof provided with a rotatable member for pressing the recording medium against said driving means;

second holding means for holding said driving means;

link means for linking said first and said second holding means to enable said first holding means to move toward and away from said second holding means;

recording-reproducing means for recording and for reproducing of information on the recording medium; and resilient means having a first pressing portion and a second pressing portion, for pressing said container member against one side of said first holding means with said first pressing portion when said first holding means is spaced apart from said second holding means, and for pressing said container member with said first pressing portion and said second pressing portion when said container member is moved toward said opposite side of said first holding means when said first holding means is moved adjacent said second holding means.

5. A recording-reproducing apparatus, comprising:

a container body having a pair of container halves for containing a recording medium therein;

a pair of liner members each of which is held between a separate one of said container halves of said container body and the recording medium, and each of which forms waves in the circumferential direction with respect to the center of the recording medium, each of said pair of liner members being fixed to one of said pair of container halves at radially formed portions which are in contact with said one of said pair of container halves;

means for rotatively driving the recording medium; and recording-reproducing means for recording and for reproducing of information on the recording medium contained in said container member and held between said liner members.

6. A recording-reproducing apparatus for recording information thereon and provided with a plurality of light-transmitting portions for transmitting light rays therethrough, said apparatus comprising;

a container body for containing the recording medium therein and provided with a plurality of openings each corresponding to one of said plurality of light-transmitting portions;

recording-reproducing means for recording and for reproducing of information on the recording medium;

photoelectric conversion means disposed to face one side of said container body, said photoelectric conversion means including a light-emitting element and a light-receiving element each facing a separate one of said light-transmitting portions; and light path change means, having an optical member facing each of said light transmitting portions, disposed to face the other side of said container body, said optical member changing the direction of travel of light rays from one of said light-transmitting portions and causing said light rays to travel to the remainder of said light-transmitting portions.

7. A recording-reproducing apparatus according to claim 6, wherein said light path changing means includes a prism which both substantially reverses the direction of travel of the incident light and causes the light to emerge therefrom.

8. A recording-reproducing apparatus operable with a container member containing a recording medium therein, comprising:

first holding means having an upper surface for holding the container member, said first holding means defining an opening into which said container member is received in an insertion direction, said opening having a height greater than the thickness of said container member so that said container member can move in a predetermined direction substantially perpendicular to the insertion direction when received in said opening;

resilient means, provided in said first holding means, for pressing said container member in the predetermined direction away from said upper surface;

means for rotatively driving the recording medium contained in said container member;

second holding means for holding said driving means;

link means for linking said first and said second holding means for relative movement toward and away from each other, said container member being held away from said upper surface of said first holding means by said resilient means when said first holding means is moved away said second holding means in a first position, said second holding means acting against the pressing force of said resilient means to force said container member to move toward said upper surface of said first holding means when said first holding means is moved toward said second holding means in a second position;

adjusting means, provided in the region of said upper surface of said first holding means, for adjusting the position of the recording medium in said container member when said first holding means is moved toward said second holding means to the second position; and recording-reproducing means for recording information on the recording medium and for reproducing information from the recording medium.

9. A recording-reproducing apparatus according to claim 8, wherein said resilient means has a plurality of pressing portions and said plurality of pressing portions press against the container member when said first holding means is moved toward said second holding means to the second position.

10. A recording-reproducing apparatus according to claim 8, further comprising:
biasing means for biasing said first holding means to move away from said second holding means; and
restraining means for restraining said first holding means at the second position with said adjusting means operationg to adjust the position of said recording medium in the container member.

* * * * *